3,772,247
SILOXANES
William Tait Flannigan, Kilwinning, Scotland, assignor to Imperial Chemical Industries Limited, London, England
No Drawing. Filed Sept. 8, 1972, Ser. No. 287,486
Int. Cl. C08f 11/04
U.S. Cl. 260—46.5 H                                    7 Claims

ABSTRACT OF THE DISCLOSURE

Organopolysiloxane resins are provided which consist of the units $R_3SiO_{1/2}$ and $SiO_2$ with units of the type RHSiO and/or $HSiO_{3/2}$ where R is a monovalent hydrocarbon group, selected from the group consisting of alkyl, aryl, aralkyl, alkaryl, alkenyl, cycloalkyl or cycloalkenyl groups, the ratio of $R_3SiO_{1/2}$ units and RHSiO and/or $HSiO_{3/2}$ units to $SiO_2$ units being from 0.6:1 to 1.5:1 and the ratio of $R_3SiO_{1/2}$ units to RHSiO and/or $HSiO_{3/2}$ units being from 1:1 to 50:1. Additionally, if desirable, the silicon-bonded hydroxyl content is not greater than 1.0 percent weight.

---

This invention relates to siloxanes and more particularly to organopolysiloxane resins.

A wide variety of organopolysiloxane resins are known including resins consisting of $R_3SiO_{1/2}$ and $SiO_2$ units where R is a monovalent hydrocarbon radical. While these resins are of some value they are of limited use.

According to the present invention a new and useful class of organopolysiloxane resins consist of the units $R_3SiO_{1/2}$ and $SiO_2$ with units of the type RHSiO and/or $HSiO_{3/2}$ where R is a monovalent hydrocarbon group, the ratio of $R_3SiO_{1/2}$ units and RHSiO and/or $HSiO_{3/2}$ units to $SiO_2$ units being from 0.6:1 to 1.5:1 and the ratio of $R_3SiO_{1/2}$ units to RHSiO and/or $HSiO_{3/2}$ units being from 1:1 to 50:1 and the silicon-bonded hydroxyl content being, if desired, not greater than 1.0 percent by weight thereof.

The groups R in the units $R_3SiO_{1/2}$ and RHSiO, which are not necessarily all alike, may be alkyl, aryl, aralkyl, alkaryl, alkenyl, cycloalkyl or cycloalkenyl groups. Suitable groups include, for example, methyl, ethyl, propyl, butyl, phenyl, benzyl, tolyl, mesityl, vinyl, allyl, cyclohexyl, and cyclohexenyl groups. For many purposes it is preferred that at least a major proportion of the R groups be methyl groups and it is further preferred that all of the R groups be methyl groups.

While the ratio of $R_3SiO_{1/2}$ units and RHSiO or $HSiO_{3/2}$ units to $SiO_2$ units may vary from 0.6:1 to 1.5:1 it is frequently preferred, when no RHSiO units are present, that it be from 0.6:1 to 0.7:1 and, when no $HSiO_{3/2}$ units are present, that it be from 0.9:1 to 1.1:1. It is also preferred that the ratio of $R_3SiO_{1/2}$ to RHSiO and/or $HSiO_{3/2}$ be from 3.0:1 to 10:1.

The resins of our invention may be prepared in any one of a variety of ways. Thus in one method a suitable blend of triorganohalosilane and an organodihalosilane or a trihalosilane may be hydrolysed in presence of a silica sol. For example a suitable blend of trimethylchlorosilane and methyldichlorosilane dissolved in an orange solvent may be added slowly to a stabilised silica hydrosol and the mixture thereafter heated to give the desired degree of condensation. Alternatively a triorganohalosilane may be cohydrolysed with an organodihalosilane or a trihalosilane and a tetrahalosilane. In another alternative method a solvent solution of a triorganoalkoxysilane and a trialkoxysilane or an organodialkoxysilane and a tetraalkoxysilane is hydrolysed. As prepared the resins of our invention contain silicon-bonded hydroxyl groups. For some purposes it is desired that the silicon-bonded hydroxyl content should be reduced to less than 1 percent by weight. This may be achieved by reacting the resin with a further quantity of a triorganohalogenosilane such as trimethylchlorosilane.

The resins are normally prepared in an organic solvent solution and may be diluted to a desired solids content with further quantities of a solvent. Any unreactive solvent may be used such as aliphatic and aromatic hydrocarbons, ethers and chlorinated solvents. Suitable solvents which may be used include, for example, benzene, toluene, xylene, petroleum ether, tetrahydrofuran, diethyl ether and diethoxyethane. In many cases it is preferred that the solvent be xylene on account of its cost, availability and flash point. The solids content of the solution may of course vary widely but it is frequently preferred that it be from about 20 to about 40 percent by weight.

The resins of our invention are suitable for a wide variety of uses. They may be used, for example, as modifiers in siloxane paper treating compositions, as intermediates in the preparation of other reactive resins and as cross-linking agents for room temperature curing elastomer forming compositions.

Our invention is further illustrated by the following examples in which all parts and percentages are by weight.

EXAMPLE 1

A blend of 339 parts of trimethylchlorosilane and 24.2 parts of methyldichlorosilane in 250.8 parts of xylene were added with stirring over a period of 10±2 minutes to a silica hydrosol (prepared as hereinafter described) within ½ minute of stabilising with isopropanol. The mixture was heated under total reflux at 80–85° C. for 2 hours, cooled to 60–70° C. and 500 parts of xylene added after which it was allowed to separate for 10 to 30 min. and the lower aqueous layer removed and discarded. The upper xylene solution of the resin was distilled to remove water, isopropanol and a little xylene until the stillhead temperature was 135–140° C. The xylene solution was cooled to 20° C. and filtered. The solids content was then adjusted to 30 percent by the addition of xylene.

Preparation of silica hydrosol 910 parts of a sodium silicate solution ($Na_2O:SiO_2$ ratio 1.0:3.2 solids content 39.7 percent) were diluted with 1300 parts of water. The so obtained solution of sodium silicate was added over approximately 3 minutes to 810 parts of a stirred 16.5 percent aqueous hydrochloric acid and the resulting clear pale yellow solution stabilised immediately by rapid addition of 980 parts of isopropanol.

Preparation of product having reduced SiOH content 1000 parts of the 30 percent resin solution prepared as described above were placed in a vessel fitted with a condenser and drying tube. 172 parts of trimethylchlorosilane were added and the mixture heated under reflux for 3 hours, cooled to 60–70° C. and washed several times with water at 60–70° C. to hydrolyse all the excess chlorosilane. Washing was continued until the washings had a pH of 5 to 7. The resin solution was then distilled at 135–140° C. to remove water and any hexamethyldisiloxane formed by hydrolysis of excess trimethylchlorosilane, cooled and the solids content adjusted to 30 percent by addition of xylene.

The final product was a mobile solution in xylene of a brittle solid which was completely soluble in most organic solvents.

EXAMPLE 2

The process of Example 1 was repeated except that the chlorosilane blend consisted of 302 parts of trimethylchlorosilane, 40.5 parts of methyldichlorosilane and 271.5 parts of xylene were used. The final product was a mobile solution of a brittle solid in xylene at 30 percent solids.

EXAMPLE 3

The process of Example 1 was repeated except that a chlorosilane blend consisting of 251 parts of trimethylchlorosilane, 67 parts of methyldichlorosilane and 296 parts of xylene were used. The final product was a mobile solution of a bittle solid in xylene at 30 percent solids.

EXAMPLE 4

The process of Example 1 was repeated except that the silica hydrosol was prepared using 865 parts of the same sodium silicate solution and there was used a chlorosilane blend consisting of 377 parts of trimethylchlorosilane, 41.6 parts of trichlorosilane and 381.4 parts of xylene. The final product was a mobile xylene solution of a brittle solid at 30 percent solids.

EXAMPLE 5

The process of Example 1 was repeated except that the silica hydrosol was prepared using 819 parts instead of 910 parts of the same sodium silicate solution and there was used a chlorosilane blend consisting of 377 parts of trimethylchlorosilane, 83.2 parts of trichlorosilane and 339.8 parts of xylene. The product was a brittle solid in the form of mobile 30 percent solution in xylene.

EXAMPLE 6

The process of Example 1 was repeated except that the hydrosol was prepared using 726 parts instead of 910 parts of the same sodium silicate solution and a chlorosilane blend consisting of 377 parts of trimethylchlorosilane, 166 parts of trichlorosilane and 257 parts of xylene were used. The product was a brittle solid in the form of a mobile 30 percent solution in xylene.

The products of the examples were tested as modifiers in paper treating compositions. Six compositions were made up each consisting of 100 parts of a toluene solution of 7.5 parts of a linear hydroxy-ended dimethylpolysiloxane of viscosity $10^7$ cs. at 25° C., 0.45 part of a linear trimethylsilyl ended methylhydrogenpolysiloxane of viscosity 20 cs. at 25° C., and Me/Si ratio of 1.08:1, 1.0 part of a 50 percent toluene solution of a 2-aminoethoxymethylpolysiloxane having a 2-aminoethoxy:methyl:silicone ratio 0.95:1.1:1.0 and of viscosity 25 cs. at 25° C. and 1.0 part of a 50 percent solution of dibutyltin diacetate together with 0.75 or 1.25 parts of a 30 percent solution of one of the products of Examples 1 to 6.

The compositions were made by adding the polymer to the toluene solution of the dimethylpolysiloxane and methylhydrogenpolysiloxane followed by addition of the amino-compound then the tin compound with thorough mixing at each addition.

A series of vegetable parchment papers was coated each with one of the so prepared compositions using a Meyer rod to give a polysiloxane coat weight of 0.7 to 1.0 g./m.$^2$ and the composition cured by heating in a forced draught air oven at 120° C. for 30 seconds.

The coated paper was stored for periods of 2 to 3 hours, 1 day, 1 week, 4 weeks and 12 weeks and the laminates (prepared as described hereinafter) stored under ¼ p.s.i. for 1 day, 1 week and 4 weeks for each aged paper.

Preparation of laminates of coated papers

The coated paper was placed between 2 rollers set at a gap of 0.3 to 0.39 mm. (A larger gap may be necessary for thicker substrates to give an adhesive coat-weight of 28 to 30 g./m.$^2$.) A solution of a rubber based pressure-sensitive adhesive was poured on to the coated surface of the paper and the paper drawn slowly between the rollers. The adhesive film was dried in a forced draught oven at 70° C. for 4 minutes. After drying, the paper with its adhesive coating was allowed to cool to 20° C. for 10 to 15 minutes. A facing paper was applied to the adhesive film using a roller to avoid trapping air bubbles in the laminate. The facing paper used was a china-clay primed bleached kraft, the unprimed side being in contact with the adhesive.

Testing laminates

The laminates prepared above were cut into 1 inch by 6 inch strips and placed at 20° C. under a pressure of 17.8 g./cm.$^2$. The laminates were tested using a Kiel tester which measured at 180° C. the pull required to remove the facing paper from the silicone coated paper with the now transferred adhesive film. The rate of stripping was 30 cm./minute. These tests were carried out at intervals of 1 day, 1, 4 and 12 weeks from the time the laminates were prepared. The results obtained are given in Table 1 which shows that a useful increase in peel strength is obtained. The peel strength also remains comparatively steady over a period of at least twelve weeks.

TABLE 1.—EFFECT OF AGEING CURED SILICONE COATINGS ON RELEASE OF 1 DAY LAMINATES

| Product of Example | Parts of polymer solution | Blank [1] | Age of silicone coated paper before reverse lamination | | | |
|---|---|---|---|---|---|---|
| | | | 1 day | 1 week | 4 weeks | 12 weeks |
| | | | Peel strength, g./in. | | | |
| 1 | 0.75 | 100 | 180 | 170 | 160 | 150 |
|   | 1.25 |     | 250 | 250 | 250 | 200 |
| 2 | 0.75 | 100 | 210 | 140 | 150 | 150 |
|   | 1.25 |     | 270 | 200 | 210 | 200 |
| 3 | 0.75 | 80–90 | 170 | 150/170 | 160 | 140 |
|   | 1.25 |       | 260 | 250 | 240/270 | 210 |
| 4 | 0.75 | 100 | 200/220 | 150/200 | 150/200 | 200 |
|   | 1.25 |     | 150 | 200/240 | 150/230 | 200/230 |
| 5 | 0.75 | 70–100 | 130 | 110/140 | 100/150 | 100/130 |
|   | 1.25 |        | 200/230 | 170/200 | 200/240 | 180/200 |
| 6 | 0.75 | 60–80 | 150 | 120 | 100 | 100 |
|   | 1.25 |       | 200/230 | 150 | 150/160 | 120/170 |

[1] Peel strength given when modifier omitted.

What I claim is:

1. An organopolysiloxane resin consisting of the units $R_3SiO_{1/2}$ and $SiO_2$ with units of the type RHSiO and/or $HSiO_{3/2}$ where R is a monovalent hydrocarbon group selected from the group consisting of alkyl, aryl, aralkyl, alkaryl, alkenyl, cycloalkyl or cycloalkenyl groups, the ratio of $R_3SiO_{1/2}$ units and RHSiO and/or $HSiO_{3/2}$ units to $SiO_2$ units being from 0.6:1 to 1.5:1 and the ratio of $R_3SiO_{1/2}$ units to RHSiO and/or $HSiO_{3/2}$ units from being 1:1 to 50:1.

2. A resin according to claim 1 wherein the groups R are selected from the group consisting of methyl, ethyl, propyl, butyl, phenyl, benzyl tolyl, mesityl, vinyl, allyl, cyclohexyl or cyclohexenyl groups.

3. A resin according to claim 2 wherein at least a major proportion of the R groups are methyl groups.

4. A resin according to claim 1 consisting of the units $R_3SiO_{1/2}$, $SiO_2$ and $HSiO_{3/2}$ wherein the ratio of $R_3SiO_{1/2}$ and $HSiO_{3/2}$ units to $SiO_2$ units is from 0.6:1 to 0.7:1.

5. A resin according to claim 1 consisting of the units $R_3SiO_{1/2}$, $SiO_2$ and RHSiO wherein the ratio of $R_3SiO_{1/2}$ and RHSiO units to $SiO_2$ units is from 0.9:1 to 1.1:1.

6. A resin according to claim 1 wherein the ratio of $R_3SiO_{1/2}$ units to RHSiO and/or $HSiO_{3/2}$ units is from 3.0:1 to 10:1.

7. A resin according to claim 1 wherein the silicon-bonded hydroxyl content is not greater than 1.0 percent by weight thereof.

References Cited
UNITED STATES PATENTS

| | | | |
|---|---|---|---|
| 3,015,645 | 1/1962 | Tyler | 260—46.5 |
| 2,676,182 | 4/1954 | Daudt et al. | 260—46.5 |
| 2,786,042 | 3/1957 | Iler | 260—46.5 |
| 2,901,460 | 8/1959 | Boldebuck | 260—46.5 |
| 2,511,296 | 6/1950 | Rust | 260—46.5 |
| 2,715,060 | 8/1955 | Barry | 260—46.5 |
| 3,457,323 | 7/1969 | Stengle, Jr. | 260—46.5 |
| 3,554,698 | 1/1971 | Burzynski | 260—46.5 |

DONALD E. CZAJA, Primary Examiner

M. I. MARQUIS, Assistant Examiner

U.S. Cl. X.R.

117—143 A; 161—209; 260—33.2 SB, 33.6 SB, 46.5 R, 448.2 H